US010027229B2

(12) United States Patent
Yamada et al.

(10) Patent No.: US 10,027,229 B2
(45) Date of Patent: Jul. 17, 2018

(54) CIRCUIT DEVICE, SWITCHING REGULATOR, AND ELECTRONIC APPARATUS FOR DC TO DC CONVERSION

(71) Applicant: SEIKO EPSON CORPORATION, Tokyo (JP)

(72) Inventors: Atsushi Yamada, Nagoya (JP); Hideyuki Akanuma, Minowa-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/458,165

(22) Filed: Mar. 14, 2017

(65) Prior Publication Data

US 2017/0288545 A1 Oct. 5, 2017

(30) Foreign Application Priority Data

Mar. 30, 2016 (JP) ................................. 2016-067506

(51) Int. Cl.
*H02M 3/158* (2006.01)
*H02M 1/08* (2006.01)
*H02M 1/00* (2006.01)

(52) U.S. Cl.
CPC ............. *H02M 3/158* (2013.01); *H02M 1/08* (2013.01); *H02M 2001/0009* (2013.01)

(58) Field of Classification Search
CPC . H02M 3/158; H02M 1/08; H02M 2001/0009
See application file for complete search history.

(56) References Cited

U.S. PATENT DOCUMENTS 7,420,356 B2 9/2008 Hojo
8,259,421 B2 9/2012 Nakahashi et al.

FOREIGN PATENT DOCUMENTS

JP        3916163 B2    5/2007
JP   2010-045947 A    2/2010

*Primary Examiner* — Emily P Pham
(74) *Attorney, Agent, or Firm* — Oliff PLC

(57) ABSTRACT

A circuit device includes a first switching circuit that has one end connected to an output node, and turns on and off according to a drive signal, a second switching circuit that is connected in series with an impedance element between another end of the first switching circuit and a node having a predetermined potential, and turns off and on complementarily with the first switching circuit, a comparator circuit that outputs an output signal indicating whether or not a potential of the other end of the first switching circuit is higher than a determination level, and a control circuit that controls a level of the drive signal based on the output signal of the comparator such that the switching element enters a non-conduction state.

13 Claims, 5 Drawing Sheets

CIRCUIT DEVICE, SWITCHING REGULATOR, AND ELECTRONIC APPARATUS FOR DC TO DC CONVERSION

BACKGROUND

1. Technical Field

The present invention relates to a switching regulator that converts a DC voltage to a DC voltage having a different value, and a circuit device that constitutes at least a portion of the switching regulator. Furthermore, the invention relates to an electronic apparatus and the like that uses such a switching regulator.

2. Related Art

In a switching regulator that steps down a DC voltage, a drive current is supplied to an inductor by controlling on and off of a switching element in an output circuit. For example, the output circuit is constituted by a bridge circuit that includes a high-side switching element and a low-side switching element.

In the case where the high-side switching element and the low-side switching element are incorporated in a semiconductor integrated circuit device (IC), one end of the inductor, which is an external component, is connected to an output terminal of the IC, and a capacitor is connected between another end of the inductor and a power supply terminal on a low potential side. Furthermore, an IC such as an SOC (System on Chip), for example, that acts as a load circuit that receives a power supply from the switching regulator is connected to the output terminal of the IC via the inductor.

In such a synchronous rectification step-down switching regulator, magnetic energy is accumulated in the inductor due to a current that flows when the high-side switching element is in an on state. When the high-side switching element enters an off state, the low-side switching element enters an on state, and a current flows from the power supply terminal on the low potential side to the load circuit via the low-side switching element and the inductor, the current being generated by the magnetic energy accumulated in the inductor.

However, when the low-side switching element enters an on state in a state in which the load current is small, it is possible that a power loss will occur due to a reverse current flowing from the capacitor to the power supply terminal on the low potential side via the inductor and the low-side switching element. Therefore, in order to prevent the reverse current, a current detection circuit becomes necessary.

As a related technique, an abnormal current prevention circuit for a DC-DC converter that determines whether or not an abnormal current such as a reverse current from the inductor in which energy is accumulated or an over current in the inductor exists, and prevents the abnormal current when the abnormal current exists, is disclosed in JP-A-2010-45947 (Abstract, FIG. 1). In FIG. 1 in JP-A-2010-45947, although the voltage across a detection resistor 12 is a negative voltage in a normal state, a positive voltage appears when the reverse current occurs in an abnormal state.

A current comparator 30 monitors the voltage across the detection resistor 12, and sends an output signal at a high level to an AND circuit 20 in a period during which the voltage across the detection resistor 12 is a negative voltage such that an output signal of the driver 10 is transmitted to low-side switching elements 14 and 19. When the voltage across the detection resistor 12 becomes a positive voltage, the output voltage of the current comparator 30 becomes a low level, and the low-side switching elements 14 and 19 are forcibly turned off.

In JP-A-2010-45947 (Abstract, FIG. 1), a potential difference between two ends of the detection resistor 12 for current detection that is connected in series to the low-side switching element 19 is detected. However, a power loss occurs in the detection resistor 12 that is connected in a current path, and therefore, the detection resistor 12 becomes a factor in the conversion efficiency decreasing, specifically in a state in which the load current is small. Also, a current path that is constituted by the low-side switching element 19 and the detection resistor 12 for current detection is provided, in parallel with the low-side switching element 14, as a current path for the current that flows through the inductor 15. The current flowing through the low-side switching element 19 and the detection resistor 12 for current detection has a small current value in order to reduce the conduction loss, and the potential difference occurring between the two ends of the detection resistor 12 for current detection is small as well, resulting in being factors in a detection error occurring.

SUMMARY

A first advantage of some aspects of the invention is to provide a circuit device that can accurately detect a current flowing through a low-side switching element and suppress a reverse current without using a current detection resistor that incurs a power loss. Also, a second advantage of some aspects of the invention is to provide a switching regulator that uses such a circuit device. Furthermore, a third advantage of some aspects of the invention is to provide an electronic apparatus and the like that uses such a switching regulator.

A circuit device according to a first aspect of the invention includes: a first switching circuit whose one end is connected to an output node to which one end of a first switching element whose other end is connected to a first power supply node and one end of a second switching element whose other end is connected to a second power supply node having a lower potential than the first power supply node are connected, and that enters a conduction state or a non-conduction state according to a drive signal that drives the second switching element; a second switching circuit that is connected between another end of the first switching circuit and a node having a predetermined potential, and enters a non-conduction state or a conduction state complementarily with the first switching circuit; an impedance element connected in series with the second switching circuit between the other end of the first switching circuit and the node having the predetermined potential; a comparator circuit that has an input terminal to which a potential of the other end of the first switching circuit is applied, and outputs an output signal indicating whether or not a potential of the input terminal is higher than a determination level; and a control circuit that, when the output signal indicating that the potential of the input terminal is higher than the determination level is output from the comparator circuit in a state in which the second switching element is in a conduction state, controls a level of the drive signal such that the second switching element enters a non-conduction state. Note that, in this application, the term "being connected" is used intending to include cases of being electrically connected.

According to the first aspect of the invention, the comparator circuit that outputs the output signal indicating whether or not the potential of the output node that is applied to the input terminal via the first switching circuit is higher than the determination level and the control circuit that, when the output signal indicating that the potential of the input terminal is higher than the determination level is output from the comparator circuit in a state in which the second switching element is in a conduction state, causes the second switching element to enter a non-conduction state are provided, and therefore, a reverse current can be suppressed by detecting a current flowing through the second switching element without using a current detection resistor that incurs a power loss.

Also, when the second switching element and the first switching circuit are in a non-conduction state, the second switching circuit enters a conduction state, and the predetermined potential is thereby applied to the input terminal of the comparator circuit, and as a result, unnecessary fluctuation of the output signal of the comparator circuit can be stopped. Furthermore, as a result of at least one of the first switching circuit and the second switching circuit entering a non-conduction state, a current path between the output node and the node having the predetermined potential does not exist other than a current path that is formed when the second switching element is in a conduction state, and therefore, the detection accuracy in detecting a current can be improved.

Here, the impedance element and the second switching circuit may be connected in series between the other end of the first switching circuit and the first power supply node. In this case, the input terminal of the comparator circuit is pulled up to a power supply potential on a high potential side when the first switching circuit is in a non-conduction state, and unnecessary fluctuation of the output signal of the comparator circuit can thereby be stopped.

Alternatively, the impedance element and the second switching circuit may be connected in series between the other end of the first switching circuit and the second power supply node. In this case, the input terminal of the comparator circuit is pulled down to a power supply potential on a low potential side when the first switching circuit is in a non-conduction state, and unnecessary fluctuation of the output signal of the comparator circuit can thereby be stopped.

Also, the second switching circuit may include a MOS field effect transistor that is connected further on a side of the node having the predetermined potential than the impedance element. In this case, the substrate potential of the MOS field effect transistor becomes the same as the source potential, and thereby an increase in the threshold voltage of the MOS field effect transistor can be prevented.

A circuit device according to a second aspect of the invention includes: a first switching circuit whose one end is connected to an output node to which one end of a first switching element whose another end is connected to a first power supply node and one end of a second switching element whose another end is connected to a second power supply node having a lower potential than the first power supply node are connected, and that enters a conduction state or a non-conduction state according to a drive signal that drives the second switching element; a second switching circuit that is connected between another end of the first switching circuit and a node having a predetermined potential, enters a non-conduction state or a conduction state complementarily with the first switching circuit, and has a higher on-resistance than the first switching circuit; a comparator circuit that has an input terminal to which a potential of the other end of the first switching circuit is applied, and outputs an output signal indicating whether or not a potential of the input terminal is higher than a determination level; and a control circuit that, when the output signal indicating that the potential of the input terminal is higher than the determination level is output from the comparator circuit in a state in which the second switching element is in a conduction state, controls a level of the drive signal such that the second switching element enters a non-conduction state. Also according to the second aspect of the invention, similar effects to those of the circuit device according to the first aspect of the invention can be achieved.

In the above, the comparator circuit may further include a second input terminal connected to the second power supply node, an offset voltage being set between the input terminal and the second input terminal, and compare the potential of the other end of the first switching circuit with the determination level that is lower than a potential of the second power supply node by the offset voltage. In this case, a desired determination level can be set by the offset voltage of the comparator circuit, and a power loss can be further reduced by setting the detection timing of the reverse current earlier.

Also, the circuit device may further include the first switching element connected between the first power supply node and the output node and the second switching element connected between the second power supply node and the output node. In the case where the first and second switching elements are incorporated in a circuit device such as an IC, the size of the switching regulator can be reduced.

A switching regulator according to a third aspect of the invention includes any of the aforementioned circuit devices; an inductor that has one end connected to the output node and is supplied with a drive current from the first switching element; and a capacitor that is connected between another end of the inductor and the second power supply node and accumulates a charge supplied from the inductor. According to the third aspect of the invention, a switching regulator having a high conversion efficiency can be provided by using the circuit device that can suppress a reverse current by accurately detecting a current flowing through the second switching element without using a current detection resistor that incurs a power loss.

Furthermore, an electronic apparatus according to a fourth aspect of the invention includes a switching regulator according to the second aspect of the invention. According to the fourth aspect of the invention, an electronic apparatus whose power consumption is low can be provided by using the switching regulator having high conversion efficiency.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
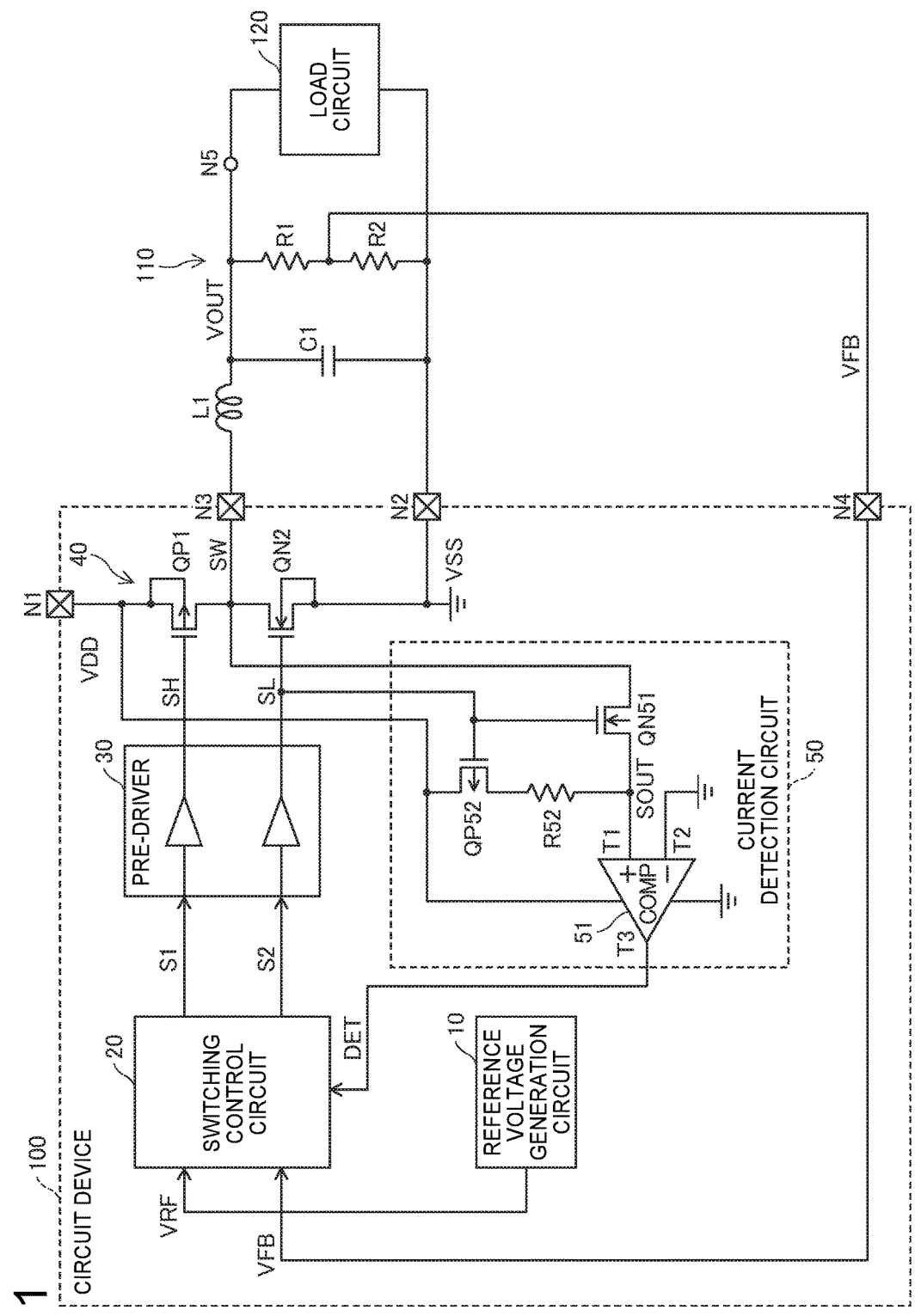
FIG. 1 is a circuit diagram illustrating a switching regulator according to a first embodiment of the invention.

Hereinafter, an embodiment of the invention will be described in detail with reference to the drawings. Note that the same constituent elements are given the same reference numerals, and redundant description is omitted.

First Embodiment

FIG. 1 is a circuit diagram illustrating an exemplary configuration of a switching regulator according to a first embodiment of the invention. The switching regulator includes a circuit device 100 according to the first embodiment of the invention. As shown in FIG. 1, the circuit device 100 may include a reference voltage generation circuit 10, a switching control circuit 20, a pre-driver 30, an output circuit 40, and a current detection circuit 50.

At least some of the constituent elements shown in FIG. 1 may be incorporated in a semiconductor integrated circuit device (IC). The IC is constituted by an IC chip in which circuits are formed on a silicon substrate, for example, or is constituted by an IC chip being housed in a package. In this case, nodes N1 to N4 in the circuit device 100 correspond to pads (terminals) in the IC chip, or pins (terminals) provided in the package.

Also, the switching regulator may further include an inductor L1, a capacitor C1 and a voltage divider circuit 110. At least some of the constituent elements may be not incorporated in the IC, and may be external components. Furthermore, for example, an IC such as an SOC (System on Chip), which is a load circuit 120 that receives power supply from the switching regulator, is connected to the circuit device 100 via the inductor L1.

In the circuit device 100, a first power supply potential (power supply potential on a high potential side) VDD is supplied to the power supply node N1, and a second power supply potential (power supply potential on a low potential side) VSS that is lower than the first power supply potential VDD is supplied to the power supply node N2. Hereinafter, a case where the power supply potential on the high potential side VDD is 5 V, and the power supply potential on the low potential side VSS is 0 V (reference potential) will be described as an example.

The circuit device 100 generates an output signal SW by performing a switching operation, and supplies a drive current to the inductor L1 connected to the output node N3. Accordingly, the power supply potential on the high potential side VDD is stepped down, and an output power supply potential VOUT is generated at a connection node N5. The output power supply potential VOUT is supplied to the load circuit 120 connected between the connection node N5 and the power supply node N2.

The voltage divider circuit 110 includes resistance elements R1 and R2 that are connected in series between the connection node N5 and the power supply node N2, and generates a feedback voltage VFB by dividing an output voltage (VOUT-VSS) between the connection node N5 and the power supply node N2. The feedback voltage VFB is supplied to the circuit device 100 via the feedback node N4.

The reference voltage generation circuit 10 includes a bandgap reference circuit and the like, for example, and generates a reference voltage VRF. The switching control circuit 20 generates control signals S1 and S2 whose pulse width is modulated by performing a PWM (Pulse Width Modulation) based on a difference between the reference voltage VRF and the feedback voltage VFB. The control signals S1 and S2 are supplied to the pre-driver 30.

The pre-driver 30 includes a buffer circuit and the like, for example, and generates drive signals SH and SL based on the control signals S1 and S2. The output circuit 40 includes a P-channel MOS transistor QP1 serving as a high-side switching element, and an N-channel MOS transistor QN2 serving as a low-side switching element. In the case where the transistors QP1 and QN2 are incorporated in the circuit device 100, the size of the switching regulator can be reduced and the number of components can be reduced, and as a result, the manufacturing cost of an electronic apparatus can be reduced.

The transistor QP1 is connected between the power supply node N1 and the output node N3, and upon entering a conduction state (on state) as per the drive signal SH, causes the potential of the output node N3 to approach the potential of the power supply node N1. The transistor QP1 has a gate to which the drive signal SH is applied, a source connected to the power supply node N1, and a drain connected to the output node N3. The transistor QP1 enters an on state when potential of the drive signal SH decreases below the power supply potential VDD by a threshold voltage or more, and supplies the drive current to the inductor L1 via the output node N3.

The transistor QN2 is connected between the power supply node N2 and the output node N3, and upon entering an on state according to the drive signal SL, causes the potential of the output node N3 to approach the potential of the power supply node N2. The transistor QN2 has a gate to which the drive signal SL is applied, a drain connected to the output node N3, and a source connected to the power supply node N2. The transistor QN2 enters an on state when the potential of the drive signal SL rises above the reference potential VSS by a threshold voltage or more, and causes a current to flow to the inductor L1 via the output node N3.

The inductor L1 includes one end connected to the output node N3 and the other end connected to the connection node N5, and is supplied with the drive current from the transistor QP1 in the output circuit 40. The capacitor C1 is connected between the other end (connection node N5) of the inductor L1 and the power supply node N2, and generates a smoothed output voltage (VOUT-VSS) by accumulating charges supplied from the inductor L1.

As a result of the transistors QP1 and QN2 in the output circuit 40 performing a switching operation in this way, the output signal SW is generated, and the drive current is supplied to the inductor L1 connected to the output node N3. Accordingly, the output power supply potential VOUT obtained by stepping down the power supply potential VDD is generated at the connection node N5 that is a connection point between the inductor L1 and the capacitor C1. The switching control circuit 20 controls the switching operation of the transistors QP1 and QN2 in the output circuit 40 by generating the control signals S1 and S2. The output power supply potential VOUT is mainly controlled by the duty of the control signal S1.

For example, when the control signal S1 is at a low level, the drive signal SH is at a low level, and therefore, the transistor QP1 enters a conduction state (on state). Also, when the control signal S2 is at a low level, the drive signal SL is at a low level, and therefore, the transistor QN2 enters a non-conduction state (off state). In such a period, the potential of the output node N3 approaches the power supply potential VDD, the drive current flows from the transistor QP1 to the inductor L1, electric energy is converted to magnetic energy in the inductor L1 and the magnetic energy is accumulated therein, and the electric energy is accumulated in the capacitor C1 as well.

On the other hand, when the control signal S1 is at a high level, the drive signal SH is at a high level, and the transistor QP1 is in an off state. Also, when the control signal S2 is at a high level, the drive signal SL is at a high level, and the transistor QN2 is in an on state. In such a period, the magnetic energy accumulated in the inductor L1 is discharged as electric energy via the transistor QN2, the load circuit 120, and the like. Accordingly, the potential of the output node N3 becomes a potential that is lower than the reference potential VSS (0 V) by a voltage drop due to the on-resistance of the transistor QN2.

However, in a state in which a load current is small, it is possible that, when the transistor QN2 enters an on state, a reverse current will flow from the capacitor C1 to the power supply node N2 via the inductor L1 and the transistor QN2. Specifically, at a point in time when a current becomes approximately zero as a result of an increase in the potential of the output node N3 as time passes, if the transistor QN2 is in an on state, a current path exists from the capacitor C1 to the reference potential VSS via the inductor L1 and the transistor QN2, and therefore, a reverse current flows. Therefore, in the present embodiment, the current detection circuit 50 is provided in order to suppress the reverse current.

The current detection circuit 50 includes an N-channel MOS transistor QN51 serving as a first switching circuit, a P-channel MOS transistor QP52 serving as a second switching circuit, a resistor R52 serving as an impedance element, and a comparator 51 serving as a comparator circuit. Note that these circuit elements are examples, and a bipolar transistor, a transmission gate, or the like can be used as the switching circuit, a diode, a transistor, or the like can be used as the impedance element, and a transistor, an inverter, or the like can be used as the comparator circuit.

The transistor QN51 has one end (one of a drain and a source) connected to the output node N3, another end (the other of the drain and the source) connected to an input terminal T1 of the comparator 51, and a gate to which the drive signal SL is to be applied. The transistor QN51 enters an on state or an off state according to the drive signal SL that drives the transistor QN2, which is the low-side switching element.

The resistor R52 and the transistor QP52 are connected in series between the other end of the transistor QN51 and a node having a predetermined potential. The transistor QP52 enters an off state or an on state according to the drive signal SL complementarily with the transistor QN51. That is, when the drive signal SL is at a high level, the transistor QN51 is in an on state, and the transistor QP52 is in an off state. On the other hand, when the drive signal SL is at a low level, the transistor QN51 is in an off state, and the transistor QP52 is in an on state. Note that, in this application, the term "complementarily" is used intending to also include cases where both the transistors QN51 and QP52 enter an off state only in an instant when the transistors QN51 and QP52 switch between an on state and an off state. Note that a period in which the transistors QN51 and QP52 are both in an on state does not exist.

The transistor QP52 enters an on state when the transistor QN2 and the transistor QN51 enter an off state, and the predetermined potential is thereby applied to the input terminal T1 of the comparator 51 in this way, and as a result, unnecessary fluctuation of the output signal DET of the comparator 51 can be stopped. Furthermore, as a result of at least one of the transistors QN51 and QP52 entering an off state, a current path between the output node N3 and the node having the predetermined potential does not exist, other than the current path that is formed when the transistor QN2 is in an on state, and therefore, the detection accuracy in current detection can be improved.

In the example shown in FIG. 1, the resistor R52 and the transistor QP52 are connected in series between the other end of the transistor QN51 and the power supply node N1. In this case, the input terminal T1 of the comparator 51 is pulled up to the power supply potential VDD when the transistor QN51 is in an off state, and as a result, unnecessary fluctuation of the output signal DET of the comparator 51 can be stopped.

For example, one end of the resistor R52 is connected to the other end of the transistor QN51. The transistor QP52 has a source connected to the power supply node N1, a drain connected to another end of the resistor R52, and a gate to which the drive signal SL is applied. In the case where the MOS field effect transistor QP52 is connected further on the power supply node N1 side than the resistor R52 in this way, as a result of a backgate of the transistor QP52 being connected to the power supply node N1, the substrate potential of the transistor QP52 becomes the same as the source potential, and thus an increase in the threshold voltage of the transistor QP52 can be prevented.

The comparator 51 includes an input terminal T1 to which the potential (switch output signal SOUT) of the other end of the transistor QN51 is applied, and outputs the output signal DET that indicates whether or not the potential of the input terminal T1 is higher than a determination level. For example, the comparator 51 activates the output signal DET to a high level when the potential of the input terminal T1 is higher than the determination level, and deactivates the output signal DET to a low level when the potential of the input terminal T1 is lower than the determination level.

Figure 2:
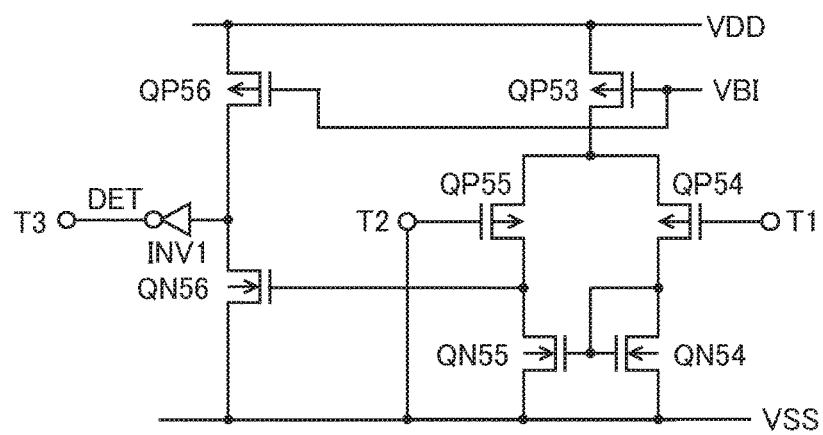
FIG. 2 is a circuit diagram illustrating an exemplary configuration of a comparator shown in FIG. 1.

FIG. 2 is a circuit diagram illustrating an exemplary configuration of the comparator shown in FIG. 1. As shown in FIG. 2, the comparator 51 includes P-channel MOS transistors QP53 to QP56, N-channel MOS transistors QN54 to QN56, and an inverter INV1, and includes the input terminal T1 to which the switch output signal SOUT (FIG. 1) is applied, an input terminal T2 that is connected to the power supply node N2 (FIG. 1) and to which the reference potential VSS is applied, and an output terminal T3 for outputting the output signal DET.

The transistor QP53 has a source connected to an interconnect of the power supply potential VDD and a gate to which a bias potential VBI is applied. The transistor QP54 has a source connected to a drain of the transistor QP53 and a gate connected to the input terminal T1 of the comparator 51. The transistor QP55 has a source connected to the drain of the transistor QP53 and a gate connected to the input terminal T2 of the comparator 51.

The transistor QN54 has a drain and a gate that are connected to a drain of the transistor QP54, and a source connected to an interconnect of the power supply potential VSS. The transistor QN55 has a drain connected to a drain of the transistor QP55, a gate connected to the drain of the transistor QP54, and a source connected to the interconnect of the power supply potential VSS.

The transistor QP56 has a source connected to the interconnect of the power supply potential VDD, and a gate to which the bias potential VBI is applied. The transistor QN56 has a drain connected to a drain of the transistor QP56, a gate that is connected to the drain of the transistor QP55 and the drain of the transistor QN55, and a source connected to the interconnect of the power supply potential VSS.

The inverter INV1 includes an input terminal that is connected to the drain of the transistor QP56 and the drain of the transistor QN56, and an output terminal connected to the output terminal T3 of the comparator 51. The inverter INV1 inverts the level of a signal that is applied to the input terminal, and outputs the inverted signal from the output terminal as the output signal DET.

Although the comparator 51 may compare the potential of the input terminal T1 with the reference potential VSS, when delay time in a control system is taken into consideration, the comparator 51 desirably compares the potential of the input terminal T1 with a potential (−10 mV, for example) that is slightly lower than the reference potential VSS. Accordingly, the detection timing of the reverse current can be set earlier, and the power loss can be further decreased.

To achieve this, an offset voltage may be set between the input terminal T1 and the input terminal T2 by changing the ratio W/L of a channel width W to a channel length L between the transistor QP54 and the transistor QP55 that constitute a differential pair. Accordingly, a desired determination level can be set by using the offset voltage of the comparator 51. For example, as a result of setting the channel width W of the transistor QP55 to be larger than the channel width W of the transistor QP54, the comparator 51 compares the potential of the switch output signal SOUT with a determination level that is lower than the reference potential VSS by the offset voltage.

Again referring to FIG. 1, when the comparator 51 outputs the output signal DET indicating that the potential of the input terminal T1 is higher than the determination level in a state in which the transistor QN2 is in an on state, the switching control circuit 20 controls the level of the drive signal SL such that the transistor QN2 enters an off state. For example, when the output signal DET of the comparator 51 is activated to a high level in a state in which the control signal S2 is at a high level, the switching control circuit 20 changes the control signal S2 to a low level. Accordingly, the pre-driver 30 changes the drive signal SL to a low level, and thus the transistor QN2 transitions from an on state to an off state.

Exemplary Operations

Figure 3:
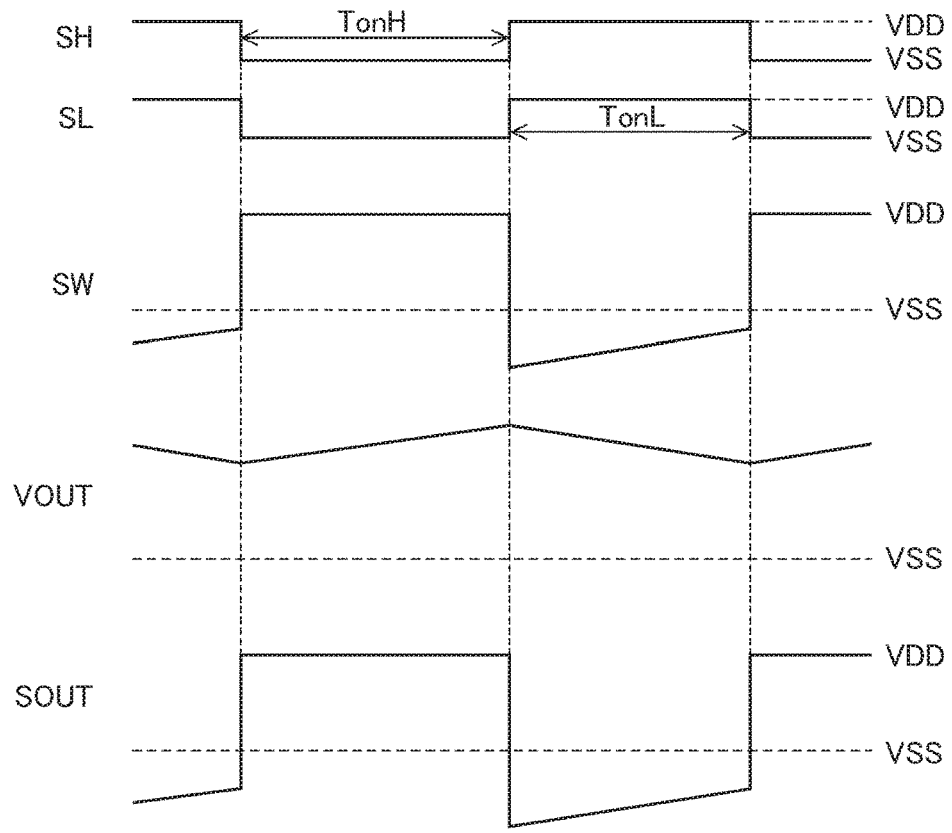
FIG. 3 is a waveform diagram illustrating waveforms at nodes in a normal operation mode.

Next, exemplary operations of the switching regulator shown in FIG. 1 will be described in detail with reference to FIGS. 1, 3, and 4. FIG. 3 is a waveform diagram illustrating waveforms at nodes in a normal operation mode in which the load current is relatively large. In the normal operation mode, the current flowing through the load circuit 120 is 100 mA or more and 2 A to 3 A or less, for example.

The switching control circuit 20 sets the control signals S1 and S2 to a low level in a first period TonH, and as a result, the pre-driver 30 sets the drive signals SH and SL to a low level. Accordingly, the transistor QP1 enters an on state and the transistor QN2 enters an off state, and therefore, the potential of the output signal SW increases to the vicinity of the power supply potential VDD. Accordingly, a current flows through the inductor L1 and magnetic energy is accumulated therein. Meanwhile, the output power supply potential VOUT is smoothed by the capacitor C1 and is kept in a predetermined range.

Since the drive signal SL is at a low level, the transistor QN51 enters an off state and the transistor QP52 enters an on state, and therefore, the potential of the switch output signal SOUT rises to the vicinity of the power supply potential VDD. Accordingly, the output signal DET of the comparator 51 is activated to a high level. Note that the switching control circuit 20 does not change the control signal S2 even if the output signal DET of the comparator 51 is activated in a state in which the control signal S2 is at a low level and the transistor QN2 is in an off state.

In a second period TonL, the switching control circuit 20 sets the control signals S1 and S2 to a high level, and therefore, the pre-driver 30 sets the drive signals SH and SL to a high level. Accordingly, the transistor QP1 enters an off state and the transistor QN2 enters an on state.

At this time, a current flows from the power supply node N2 to the load circuit 120 via the transistor QN2 and the inductor L1 due to the magnetic energy accumulated in the inductor L1, and the potential of the output signal SW decreases to a negative side across the reference potential VSS. Thereafter, the potential of the output signal SW, although approaching the reference potential VSS as time passes, keeps a negative value in the second period TonL. Meanwhile, the output power supply potential VOUT is smoothed by the capacitor C1, and is kept in a predetermined range.

Since the drive signal SL is at a high level, the transistor QN51 enters an on state and the transistor QP52 enters an off state, and therefore, the output signal SW is applied to the input terminal T1 of the comparator 51 as the switch output signal SOUT. Accordingly, the output signal DET of the comparator 51 is deactivated to a low level. Therefore, the switching control circuit 20 does not change the control signal S2.

Figure 4:
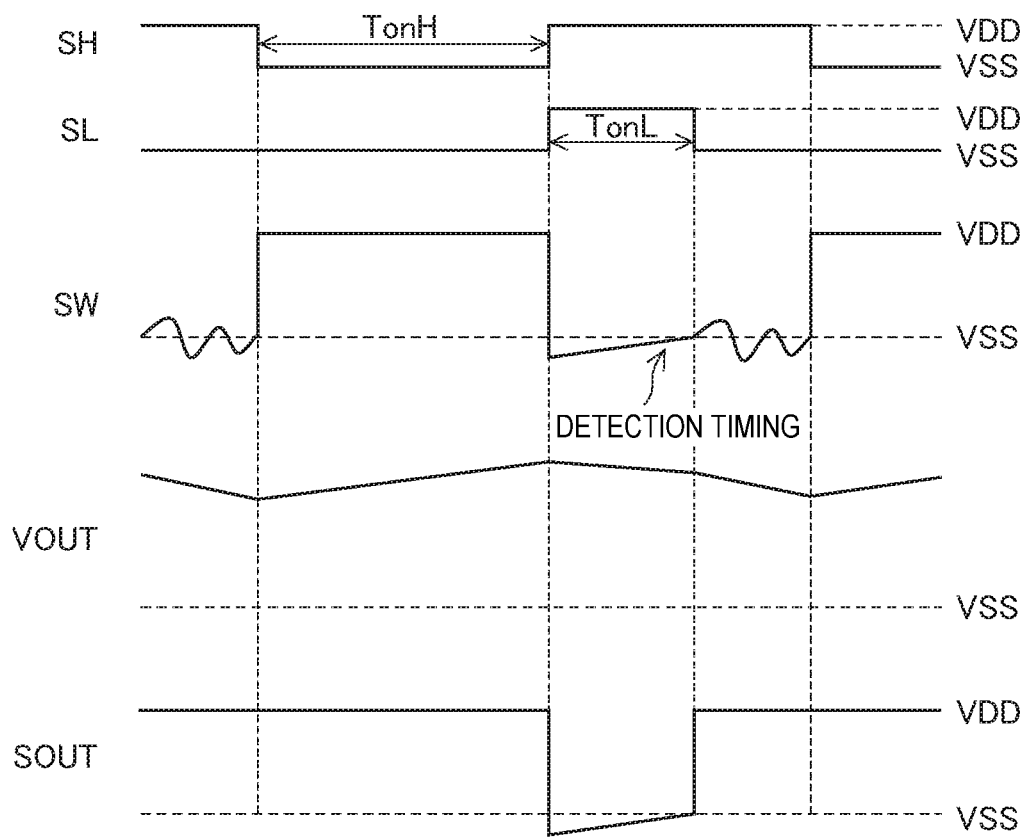
FIG. 4 is a waveform diagram illustrating waveforms at the nodes in a standby mode.

FIG. 4 is a waveform diagram illustrating waveforms at the nodes in a standby mode in which the load current is relatively small. The current flowing through the load circuit 120 in the standby mode is less than 100 mA, for example. The operations in the first period TonH are similar to those shown in FIG. 3.

In a second period TonL, the switching control circuit 20 sets the control signals S1 and S2 to a high level, and therefore, the pre-driver 30 sets the drive signals SH and SL to a high level. Accordingly, the transistor QP1 enters an off state and the transistor QN2 enters an on state, and therefore, the potential of the output signal SW decreases to a negative side across the reference potential VSS.

Note that, since the current flowing through the load circuit 120 is small, the decreasing amount of the potential of the output signal SW is small, and the potential of the output signal SW rises to the vicinity of the reference potential VSS as time passes. When the potential of the output signal SW becomes higher than the reference potential VSS, if the transistor QN2 is in an on state, a reverse current flows from the capacitor C1 to the power supply node N2 via the inductor L1 and the transistor QN2, and a power loss occurs.

Since the drive signal SL is at a high level, the transistor QN51 enters on state and the transistor QP52 enters an off state, and therefore, the output signal SW is applied to the input terminal T1 of the comparator 51 as the switch output signal SOUT. When the potential of the input terminal T1 becomes higher than the determination level, the comparator 51 activates the output signal DET (at a detection timing shown in FIG. 4). In FIG. 4, delay time in a control system is taken into consideration, and the determination level is set to a potential (−10 mV, for example) that is slightly lower than the reference potential VSS.

When the output signal DET of the comparator 51 is activated in a state in which the control signal S2 is at a high level and the transistor QN2 is in an on state, the switching control circuit 20 changes the control signal S2 to a low level such that the transistor QN2 enters an off state. Accordingly, the pre-driver 30 changes the drive signal SL to a low level, and the transistor QN2 transitions from an on state to an off state.

The switching control circuit 20 keeps the control signal S2 at a low level until the next second period TonL starts such that the transistor QN2 stays in an off state. When the transistor QN2 enters an off state, the output node N3 enters a high impedance state (unstable state), and ringing or the like occurs.

Since the drive signal SL is at a low level, the transistor QN51 enters an off state and the transistor QP52 enters an on state, and therefore, the switch output signal SOUT rises to the vicinity of the power supply potential VDD. The output signal DET of the comparator 51 is thereby kept at a high level, which is the level before the transistor QN2 has transitioned from an on state to an off state, and thus unnecessary fluctuation of the output signal DET of the comparator 51 can be stopped.

When the first period TonH starts, the switching control circuit 20 changes the control signal S1 from a high level to a low level, and keeps the control signal S2 at a low level. When the next second period TonL starts, the switching control circuit 20 changes the control signals S1 and S2 from a low level to a high level. In this way, the transistors QP1 and QN2 in the output circuit 40 continue to perform the switching operation.

According to the present embodiment, the comparator 51 that activates the output signal DET when the potential of the output node N3 that is applied via the transistor QN51 is higher than the determination level and a switching control circuit 20 that causes the transistor QN2 to enter an off state when the output signal DET of the comparator 51 is activated in a state in which the low-side transistor QN2 is in an on state are provided, and thus a reverse current can be suppressed by detecting a current flowing through the low-side transistor QN2 without using a current detection resistor that incurs a power loss.

Also, the transistor QP52 enters an on state when the transistor QN2 and the transistor QN51 enter an off state, and the predetermined potential is thereby applied to the input terminal T1 of the comparator 51, and as a result, unnecessary fluctuation of the output signal DET of the comparator 51 can be stopped. Furthermore, at least one of the transistor QN51 and the transistor QP52 enters an off state, and a current thereby does not flow between the output node N3 and the node having the predetermined potential, and as a result, the detection accuracy in current detection can be improved.

Furthermore, according to the present embodiment, a switching regulator having high conversion efficiency can be provided by using the circuit device 100 that can accurately detect a current flowing through the low-side transistor QN2 without using a current detection resistor that incurs a power loss and suppress a reverse current.

Second Embodiment

Figure 5:
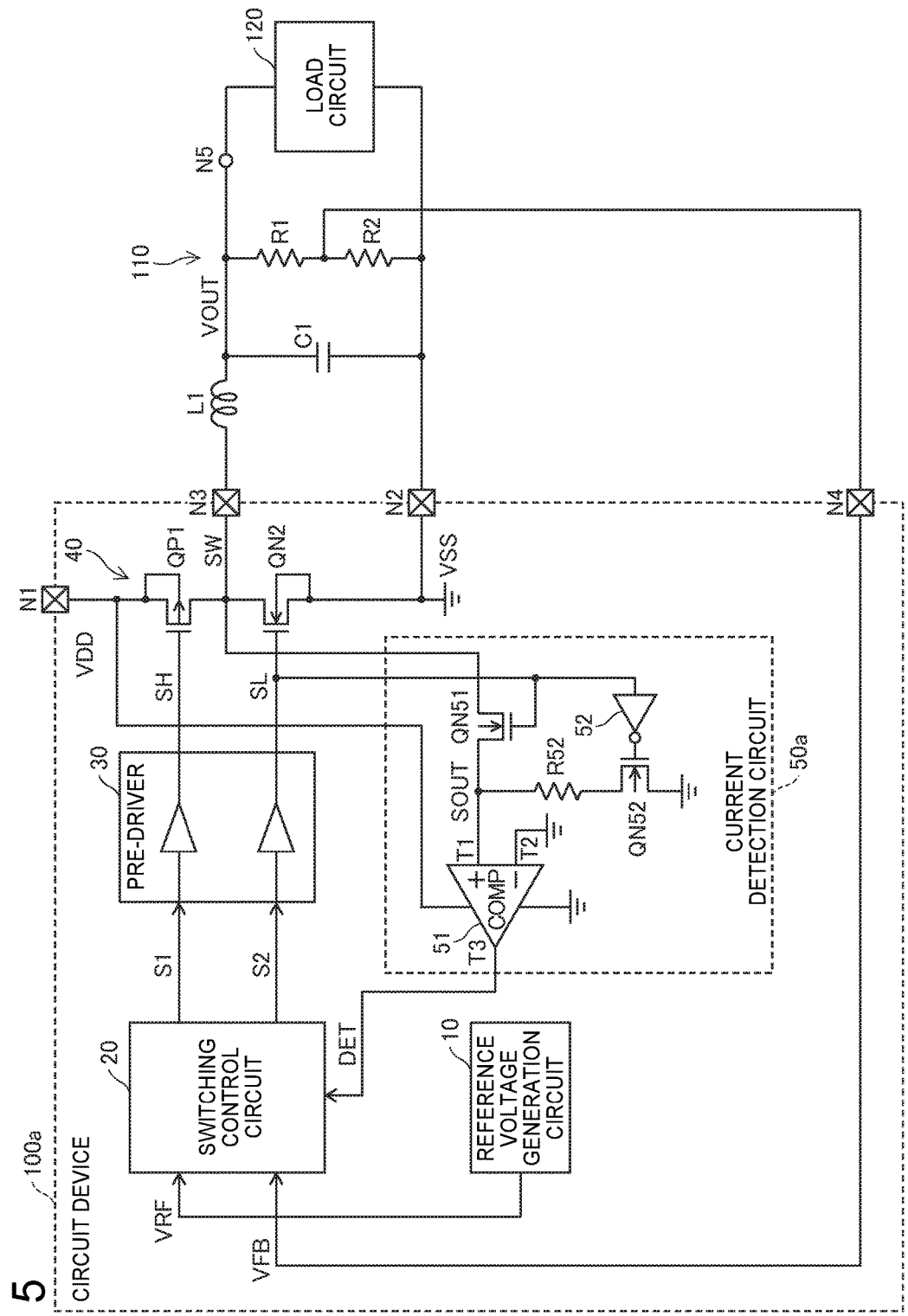
FIG. 5 is a circuit diagram illustrating a switching regulator according to a second embodiment of the invention.

FIG. 5 is a circuit diagram illustrating an exemplary configuration of a switching regulator according to a second embodiment of the invention. The switching regulator includes a circuit device 100a according to the second embodiment of the invention. The circuit device 100a includes a current detection circuit 50a in place of the current detection circuit 50 in the circuit device 100 according to the first embodiment shown in FIG. 1. In other respects, the second embodiment may be configured similarly to the first embodiment.

The current detection circuit 50a includes an N-channel MOS transistor QN51 serving as a first switching circuit, an N-channel MOS transistor QN52 serving as a second switching circuit, a resistor R52 serving as an impedance element, and a comparator 51 serving as a comparator circuit, and further includes an inverter 52.

The transistor QN51 has one end (one of a drain and a source) connected to an output node N3, another end (the other of the drain and the source) connected to an input terminal T1 of the comparator 51, and a gate to which a drive signal SL is applied. The transistor QN51 enters an on state or an off state according to the drive signal SL that drives a transistor QN2, which is a low-side switching element.

The inverter 52 inverts the drive signal SL and outputs the inverted signal. The resistor R52 and the transistor QN52 are connected in series between the other end of the transistor QN51 and a node having a predetermined potential. The transistor QN52 enters an off state or an on state according to the inverted drive signal SL complementarily with the transistor QN51. That is, when the drive signal SL is at a high level, the transistor QN51 is in an on state and the transistor QN52 is in an off state. On the other hand, when the drive signal SL is at a low level, the transistor QN51 is in an off state and the transistor QN52 is in an on state.

The transistor QN52 enters an on state when the transistor QN2 and the transistor QN51 enter an off state, and the predetermined potential is thereby applied to the input terminal T1 of the comparator 51 in this way, and as a result unnecessary fluctuation of the output signal DET of the comparator 51 can be stopped. Furthermore, at least one of the transistor QN51 and the transistor QN52 enters an off state, and a current thereby does not flow between the output node N3 and the node having the predetermined potential, and as a result, the detection accuracy in current detection can be improved.

In the example shown in FIG. 5, the resistor R52 and the transistor QN52 are connected in series between the other end of the transistor QN51 and a power supply node N2 (reference potential VSS). In this case, as a result of the input terminal T1 of the comparator 51 being pulled down to the reference potential VSS when the transistor QN51 is in an off state, unnecessary fluctuation of the output signal DET of the comparator 51 can be stopped.

For example, one end of the resistor R52 is connected to the other end of the transistor QN51. The transistor QN52 has a drain connected to another end of the resistor R52, a source connected to the power supply node N2 (reference potential VSS), and a gate to which the inverted drive signal SL is applied. In the case where the MOS field effect transistor QN52 is connected further on the power supply node N2 side than the resistor R52, as a result of connecting a backgate of the transistor QN52 to the power supply node N2, the substrate potential of the transistor QN52 becomes the same as the source potential, and therefore, an increase in the threshold voltage of the transistor QN52 can be prevented.

Third Embodiment

Next, a third embodiment of the present invention will be described. In the third embodiment, the resistor R52 serving as the impedance element is omitted in the switching regulator according to the first embodiment shown in FIG. 1 or in the switching regulator according to the second embodiment shown in FIG. 5. Instead, a transistor having a high on-resistance is used as the transistor QP52 or QN52 in the second switching circuit.

The on-resistance of the transistor QP52 or QN52 is desirably higher than those of other transistors, is specifically higher than the on-resistance of the transistor QN51 in the first switching circuit, and is further more desirably at least one order higher than the on-resistance of the transistor QN51. In other respects, the third embodiment may be configured similarly to the first embodiment or the second embodiment. Also according to the third embodiment, similar effects to the first embodiment or the second embodiment can be achieved.

Electronic Apparatus

Next, an electronic apparatus using the switching regulator according to one embodiment of the invention will be described. Hereinafter, a case where the electronic apparatus is a printer will be described as an example.

Figure 6:
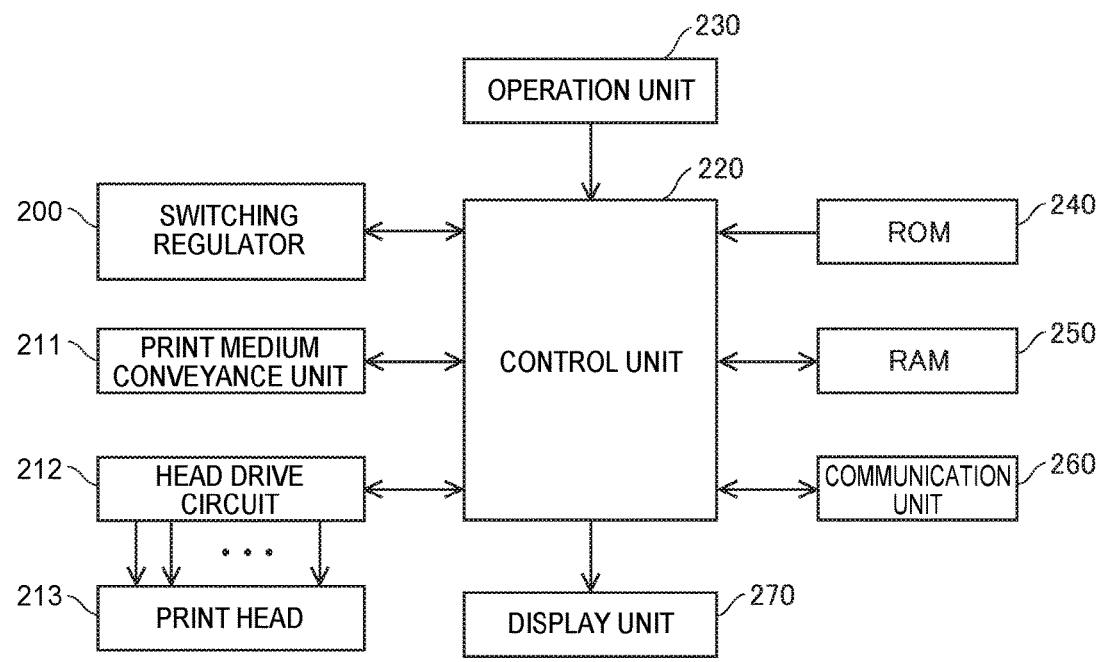
FIG. 6 is a block diagram illustrating an exemplary configuration of an electronic apparatus according to one embodiment of the invention.

FIG. 6 is a block diagram illustrating an exemplary configuration of the electronic apparatus according to one embodiment of the invention. As shown in FIG. 6, the electronic apparatus includes a switching regulator 200 according to any of the embodiments of the invention, a print medium conveyance unit 211, a head drive circuit 212, a print head 213, a control unit 220, an operation unit 230, a ROM (read only memory) 240, a RAM (random access memory) 250, a communication unit 260, and a display unit 270. Note that some of the constituent elements shown in FIG. 6 may be omitted or changed, or another constituent element may be added to the constituent elements shown in FIG. 6.

In the print medium conveyance unit 211, for example, a stepping motor drives a platen roller via a belt, and thus a sheet, which is a print medium, is conveyed. The head drive circuit 212 drives the print head 213, and thus the print head 213 performs printing on the sheet that has been conveyed by the print medium conveyance unit 211.

The control unit 220 includes a CPU (central processing device) and the like, for example, and performs various types of control processing in accordance with programs that are stored in the ROM 240 and the like. For example, the control unit 220 controls the print medium conveyance unit 211 and the head drive circuit 212 according to an operation signal supplied from the operation unit 230, controls the communication unit 260 in order to perform data communication with an external device, and generates a display signal for displaying various types of information in the display unit 270.

The operation unit 230 is an input device including operation keys, button switches or the like, and outputs operation signals according to operations performed by a user to the control unit 220, for example. The ROM 240 stores programs, data, and the like for the control unit 220 to perform various types of control processing. Also, the RAM 250 is used as a work area of the control unit 220, and temporarily stores programs and data read out from the ROM 240, and data and the like input using the operation unit 230.

The communication unit 260 is, for example, constituted by an analog circuit and a digital circuit, and performs data communication between the control unit 220 and an external device. Accordingly, the printer shown in FIG. 6 can perform a print operation based on print data supplied from an external host computer or the like. The display unit 270, for example, includes an LCD (liquid crystal display) or the like, and displays various types of information based on the display signal supplied from the control unit 220.

The switching regulator 200 steps down the power supply potential VDD (5 V) that is supplied by a power supply circuit or the like to generate the output power supply potential VOUT by performing a switching operation. The control unit 220 and the like operates with the output power supply potential VOUT being supplied from the switching regulator 200.

The electronic apparatus corresponds, in addition to the printer, a mobile terminal such as a mobile phone, a smart card, a calculator, an electronic dictionary, an electronic game machine, a digital still camera, a digital video camera, a television, a TV phone, a security television monitor, a head-mounted display, a personal computer, a network apparatus, a car navigation device, a robot, a measurement device, a medical apparatus (e.g., electronic thermometer, sphygmomanometer, blood glucose meter, electrocardiograph device, ultrasonic diagnostic apparatus, and electronic endoscope), or the like, for example.

According to the present embodiment, an electronic apparatus whose power consumption is low can be provided by using the switching regulator 200 having high conversion efficiency. Note that the invention is not limited to the embodiment described above, and many modifications can be made within the technical idea of the invention by a person having ordinary skill in the art.

This application claims priority from Japanese Patent Application No. 2016-067506 filed in the Japanese Patent Office on Mar. 30, 2016, the entire disclosure of which is hereby incorporated by reference in its entirely.

What is claimed is:

1. A circuit device comprising:
a first switching circuit that enters a conduction state or a non-conduction state according to a drive signal, a first end of the first switching circuit being connected to an output node, a first end of a first switching element and a first end of a second switching element, a second end of the first switching element being connected to a first power supply node, a second end of the second switching element being connected to a second power supply node having a lower potential than the first power supply node, and the drive signal driving the second switching element;
a second switching circuit that is connected between a second end of the first switching circuit and a node having a predetermined potential, and that enters the non-conduction state or the conduction state complementarily with the first switching circuit;
an impedance element connected in series with the second switching circuit between the second end of the first switching circuit and the node having the predetermined potential;
a comparator circuit that has an input terminal to which a potential of the second end of the first switching circuit is applied, and that outputs an output signal indicating whether or not a potential of the input terminal is higher than a determination level; and
a control circuit that, when the output signal indicating that the potential of the input terminal is higher than the determination level is output from the comparator circuit in a state in which the second switching element is in the conduction state, controls a level of the drive signal such that the second switching element enters the non-conduction state.

2. The circuit device according to claim 1,
wherein the impedance element and the second switching circuit are connected in series between the second end of the first switching circuit and the first power supply node.

3. The circuit device according to claim 1,
wherein the impedance element and the second switching circuit are connected in series between the second end of the first switching circuit and the second power supply node.

4. The circuit device according to claim 1,
wherein the second switching circuit includes a MOS field effect transistor that is connected further on a side of the node having the predetermined potential than the impedance element.

5. The circuit device according to claim 1, further comprising the first switching element connected between the first power supply node and the output node and the second switching element connected between the second power supply node and the output node.

6. The circuit device according to claim 1,
wherein the comparator circuit further includes a second input terminal connected to the second power supply node, an offset voltage being set between the input terminal and the second input terminal, and compares the potential of the second end of the first switching circuit with the determination level that is lower than a potential of the second power supply node by the offset voltage.

7. A switching regulator comprising:
the circuit device according to claim 1;
an inductor that has a first end connected to the output node and is supplied with a drive current from the first switching element; and
a capacitor that is connected between a second end of the inductor and the second power supply node and accumulates a charge supplied from the inductor.

8. An electronic apparatus comprising the switching regulator according to claim 7.

9. A circuit device comprising:
a first switching circuit, a first end of the first switching circuit being connected to an output node, a first end of a first switching element and a first end of a second switching element being connected to the output node, a second end of the first switching element being connected to a first power supply node and a second end of the second switching element being connected to a second power supply node having a lower potential than the first power supply node, and the first switching circuit entering a conduction state or a non-conduction state according to a drive signal that drives the second switching element;
a second switching circuit that is connected between a second end of the first switching circuit and a node having a predetermined potential, the second switching circuit entering the non-conduction state or the conduction state complementarily with the first switching circuit, and the second switching circuit having a higher on-resistance than the first switching circuit;
a comparator circuit that has an input terminal to which a potential of the second end of the first switching circuit is applied, and that outputs an output signal indicating whether or not a potential of the input terminal is higher than a determination level; and
a control circuit that, when the output signal indicating that the potential of the input terminal is higher than the determination level is output from the comparator circuit in a state in which the second switching element is in the conduction state, controls a level of the drive signal such that the second switching element enters the non-conduction state.

10. The circuit device according to claim 9,
wherein the comparator circuit further includes a second input terminal connected to the second power supply node, an offset voltage being set between the input terminal and the second input terminal, and compares the potential of the second end of the first switching circuit with the determination level that is lower than a potential of the second power supply node by the offset voltage.

11. The circuit device according to claim 9, further comprising the first switching element connected between the first power supply node and the output node and the second switching element connected between the second power supply node and the output node.

12. A switching regulator comprising:
the circuit device according to claim 9;
an inductor that has a first end connected to the output node and is supplied with a drive current from the first switching element; and
a capacitor that is connected between a second end of the inductor and the second power supply node and accumulates a charge supplied from the inductor.

13. An electronic apparatus comprising the switching regulator according to claim 12.

* * * * *